Nov. 10, 1953     I. E. NUTTER     2,658,737
MEANS FOR FLOW CONTROL IN BUBBLE TOWERS
Filed March 10, 1950     4 Sheets-Sheet 1

INVENTOR.
IRVIN E. NUTTER
BY
Cushman Darby Cushman
ATTORNEYS

Nov. 10, 1953           I. E. NUTTER           2,658,737
MEANS FOR FLOW CONTROL IN BUBBLE TOWERS
Filed March 10, 1950           4 Sheets-Sheet 2

INVENTOR
IRVIN E. NUTTER

BY Cushman Darby & Cushman

ATTORNEYS

Nov. 10, 1953  I. E. NUTTER  2,658,737
MEANS FOR FLOW CONTROL IN BUBBLE TOWERS
Filed March 10, 1950  4 Sheets-Sheet 3

INVENTOR
IRVIN E. NUTTER

BY Cushman Davis & Cushman
ATTORNEYS

Nov. 10, 1953     I. E. NUTTER     2,658,737
MEANS FOR FLOW CONTROL IN BUBBLE TOWERS
Filed March 10, 1950     4 Sheets-Sheet 4

INVENTOR
IRVIN E. NUTTER

BY Cushman Darby & Cushman

ATTORNEYS

Patented Nov. 10, 1953

2,658,737

UNITED STATES PATENT OFFICE 2,658,737

MEANS FOR FLOW CONTROL IN BUBBLE TOWERS

Irvin E. Nutter, Amarillo, Tex.

Application March 10, 1950, Serial No. 148,945

1 Claim. (Cl. 261—114)

The present invention relates to gas or vapor and liquid contact apparatus of the type generally referred to as bubble towers, and has for an object the provision of a method and means for producing uniform distribution of flow of gas or vapor through a plurality of flow passages for intimate contact and mixture with liquid.

The bubble tower is an important part of a fractionation, absorption, distillation, and other systems by means of which gas or vapor and liquid materials are separated, recovered, refined or purified by the accomplishment of continuous multiple distillation with counterflow of the gas or vapor and liquid materials. Bubble towers are also used in extraction processes to leach out an impurity by one of the materials from the other. More particularly, in petroleum fractionation, a mixture of components may be separated into two groups of components by separation of one or more of the lower or higher boiling point components from the others; or, in the case of a binary mixture, two components may be separated from one another to a relatively pure state where a vapor fraction is passed in countercurrent relation with a liquid fraction of petroleum. By repeated intimate contact between ascending vapor and descending liquid, with heat ordinarily supplied at the base of the tower and cooling supplied at the top of the tower, the higher boiling point fractions are selectively condensed and travel towards the base of the tower as a liquid and the lower boiling point fractions are selectively vaporized and travel towards the top of the tower. The mixture to be separated is usually introduced as a liquid at some point near the middle of the tower at a temperature near the temperature of the boiling mixture within the tower at that point, with such point being above approximately half the bubble trays and below the remaining trays. The descending liquid reaching the base of the tower is withdrawn in a continuous stream as one product of the operation, but a portion of this product is continually accumulated, predominantly in the lower area of the tower, continually revaporized and driven up the tower to supply heat on the ascending route to vaporize lower boiling point fractions traveling downward in the liquid, which in turn recondense these heavier boiling point fractions which, of course, return to the base of the tower. The ascending vapor reaching the top of the tower is withdrawn in a continuous vapor stream as the other product of the operation, but a portion of this product is continually accumulated, predominantly in the upper area of the tower, continually condensed to a liquid by an outside source of cooling, for travel down the tower as a liquid reflux to remove heat on the descending route to condense higher boiling point fractions traveling upward in the vapor, which in turn re-evaporate the lower boiling point fractions for ascending flow to the top of the tower. The process is quite complex in that on any particular tray there will be present a mixture of heavier components and lighter components in terms of their boiling point, with the purity of the lighter fraction increasing on the approach to the top of the tower and the purity of the heavier fraction increasing on the approach to the base of the tower. The degree of purity of the products produced, though never perfect, is dependent on the energy supplied to the system in the form of heat at the base of the tower and complementary cooling to produce liquid reflux at the top of the tower, and also the number of trays and their efficiency or ability to accomplish intimacy of contact. The greater the efficiency or intimacy of contact of the trays the lesser the energy requirement and the smaller the facilities for their supply, or, with greater efficiency a lesser number of trays and a smaller bubble tower are needed for the same overall results.

In order to provide contact between the ascending vapor and the descending liquid reflux, on standard bubble towers now used, each of a relatively large number of trays in a bubble tower is provided with a plurality of openings, each of which has heretofore been covered by a bubble cap having openings or slots formed in the walls thereof. A chimney extends upwardly from the tray floor to a point within the bubble cap above the top of the aforesaid openings or slots formed in the walls of the bubble cap. The chimney is in communication from below the tray to within the cap. A level of liquid is maintained above the openings or slots of the bubble cap but below the top of the chimney within the cap by provision of a constant supply of liquid through an entrance weir to the tray and by an overflow or exit weir from the tray. With such an arrangement, the ascending vapor passes through the openings in the tray through the chimneys to within the caps, thence through the openings or slots in the walls of the bubble caps below the surface of the liquid to contact with the liquid around the caps. The position of the upper end of the chimney being above the surface of liquid surrounding the cap prevents the backflow of liquid through the cap to the tray below. When the vapor equally divides throughout the openings in the tray, the contact efficiency of the bubble tower is relatively high and the fractionation operation is relatively efficient.

In the construction of bubble trays to meet the foregoing requirements, using chimneys in conjunction with bubble caps, it is not possible to design for a very wide range of capacity of gas or vapor for reasonable efficiency. When the chimneys are made large enough to afford a slight resistance to gas or vapor flow for good distribution at peak capacity, as may be set by the size or flow capacity of the tower, they then do not afford sufficient resistance at lesser operating loads to effect gas or vapor distribution whenever the head or liquid on the entrance side of the tray is slightly more than on the exit side to effect flow across the tray, whenever the bubble tray may not be exactly level, or whenever for some reason the liquid cascades over the entrance weir and flows unevenly over the tray. Whenever any one, any combination, or all of these conditions of unevenness of liquid level around the bubble caps occur, the bubble caps surrounded by the lower level of liquid will take substantially all of the gas or vapor, leaving the other bubble caps inoperative. Whenever these chimneys are sized smaller for resistance to gas or vapor flow at some capacity less than that which the bubble tower size may be capable of handling, they are still no more suitable for some lower capacity operation than the above described arrangement for reasons above set forth in connection with liquid level. In addition, a bubble tower with reduced size chimneys, to afford good distribution, usually cannot be brought up to the capacity for which the tower is capable of operating because the resistance of gas or vapor flow through the chimneys reaches or exceeds the equivalent of liquid head from one tray floor to the other. When this occurs, the liquid cannot travel downward and "liquid flooding" of the bubble tower results, which renders the entire bubble tower inoperative.

In addition to the foregoing limitations on some bubble towers, usually of larger diameter, the liquid gradient across the bubble tray or head of liquid on the entrance side of the bubble tray, as compared to the exit side, is so high there are occasions when the liquid gets sufficiently above the tops of the chimneys on the liquid entrance side of the bubble tray to exceed the differential pressure of gas through the chimney. When this occurs, some of the liquid flows through the bubble caps and chimneys on the oil entrance side of the tray to the tray below, thus "short circuiting" full travel of liquid across the bubble tray, and results in a severe lowering of the required efficiency. This latter shortcoming usually occurs at high liquid capacities and reduced gas or vapor capacities when distribution across the bubble tray is poor due to insufficient differential across the bubble tray and while only part of the bubble caps are functioning as above described, thus double effecting poor efficiency.

As the bubble tower comes into operation by flow of ascending gas or vapor through the chimneys and bubble caps in a bubble tray, any flow of gas or vapor is the direct result of pressure differential acros the bubble tray which exceeds the head of the liquid above the bubble tray. However, as soon as the differential of pressure exceeds that head, gas or vapor flows through a chimney and bubble cap, but as soon as the flow starts through one of the chimneys and bubble caps, the liquid surrounding the chimney and bubble cap is, of course, filled with gas or vapor, which immediately reduces the density of the liquid and thus the head of liquid about the chimney and bubble cap. Thus, there follows upon initiation of flow of gas or vapor a substantial reduction in resistance to flow at that point, which means that the flow path of even lower resistance is through the chimney and cap through which the flow was first initiated. By reason of decreased head, there is a greater flow of gas or vapor. Thus, as one or a minority of bubble caps come into operation, the action is such as to provide paths of lowest flow resistance which take all of the ascending gas or vapor until there is re-established sufficient differential of pressure at the remaining bubble caps, by increased volumes of gas or vapor or load increase, to overcome the head of liquid at each of the remaining bubble caps on the bubble tray. This additional differential of pressure can be produced by increased throughput, which may not be possible, or by the increase in use of energy in the form of heat applied to the base of the tower and a like amount of cooling applied to the top of the tower, which would otherwise not be needed if the tower were capable of operating efficiently at reduced gas or vapor capacity.

The importance of the foregoing will be apparent by considering the fact that bubble towers are ordinarily designed for operation at 100 percent capacity, and are generally adequate for operation somewhat in excess of designed capacity. However, such bubble towers are frequently operated over long periods of time at less than the designed capacity, for example as low as 25 percent of designed capacity. When operated at as much as moderately less than maximum capacity, the foregoing effects result and only a portion of the chimneys and bubble caps will be effective, thus resulting in inefficient operation. In the case of a fractionation operation, heretofore described, the desired purity of products may be attainable at reduced capacity, in terms of the volume of product to be charged to the system, by the use of slightly more than the same energy requirement at full load, which in terms of a 25 percent load would be over 400 percent of the required energy needed to do the job if the bubble tower were capable of effective utilization of exactly the required vapor load needed. However, in the case of absorption and other systems, by means of which gas or vapor and liquid materials are recovered or purified and in which there is no means of induced recycle capacity, such as in fractionation, such systems are unable to produce the specification results when operated moderately less than designed capacity. In such cases, either the bubble towers will need be altered or other parts of the plant will need be changed to compensate for the malfunction of the bubble tower, either one of which is usually quite expensive. If the duration of low capacity is intermittent, in such cases, then usually a loss of production or penalty for off specification production results for such periods.

In accordance with the present invention, there has been provided a method of and a means for automatically regulating the areas of the flow passages through the bubble trays in accordance with the differential of pressure across the bubble trays. The method of automatically regulating the areas of the flow passages is substituted for chimneys when bubble caps are used, but may be applied at least equally advantageously without the use of either the bubble caps or their accompanying chimneys. The increase in the area of each flow passage is opposed by a force which increases with increase in the differential of pressure and with increase of area of each flow passage. In this manner there is minimized the effect of differences of liquid head at each flow passage, by reason of initial differences in submergence in liquid above and surrounding the different flow passages, when gas or vapor flow starts and progresses. These devices so function that any effect of difference in liquid head among the different flow passages on the bubble tray is, percentage wise, almost eliminated before gas or vapor flow starts. For this reason no perceptible unevenness in distribution of gas or vapor exists when gas or vapor flow starts. Thus, as the rate of gas or vapor flow progresses and the liquid surrounding the flow passages loses its density, the difference in liquid head among the different flow passages on the bubble tray is infinitely further reduced, percentage wise, to where, for all practical purposes, the liquid head among the different flow passages on the entire bubble tray becomes the same.

More particularly, in carrying out the present invention, there is provided at each opening of the bubble tray a flow-controlling element which normally closes the bubble tray opening, but which is automatically moved against the bias of a spring to open the flow passage with an area thereof related to the differential of pressure across the tray. By automatic individual regulation of the area of each flow passage in the foregoing manner, equalized flow of gas or vapor is procured amongst the plurality of openings in each of the bubble trays of the tower. All openings are for all loads simultaneously and continuously effective with a spring bias controlling the areas of the flow passages thus minimizing the effect of any initial variable liquid head with apparent complete elimination of variable liquid head thereon as upon starting of the flow of gas or vapor.

Heretofore, bubble caps and chimneys at best provide only a lazy contact of gas or vapor with the liquid surrounding the bubble caps, whereby only relatively large bubbles of gas or vapor travel through the liquid and afford relatively small surface areas for contact between the gas or vapor and the liquid.

However, in accordance with the present invention, in addition to the aforementioned features, there is provided means of laterally jetting the gas or vapor into the liquid at relatively high velocity, thus causing the gas or vapor to break up into very fine bubbles upon entry into the liquid as is manifest by the large quantity of froth produced over the bubble tray. By comparison under identical conditions, practically no froth, if any, is produced over a bubble tray equipped with bubble caps and chimneys, which instead produce more of a violent agitation with droplets of liquid being thrown high above the surface of the bubble tray by the breaking up of the large bubbles emitted from the bubble caps.

In my Patent 2,428,889 there is disclosed gravity-biased valves at each opening of a bubble tray but such gravity bias of constant magnitude has not satisfactorily solved the problem of equalized flow, whereas the present invention has efficiently achieved that objective.

In the specification and claim the term "gas" includes gases and vapors and the term "vapor" includes gases and vapors.

For a more detailed understanding of the invention and for further objects and advantages thereof, reference is to be had to the following description taken in conjunction with the accompanying claim and drawings, in which:

Figure 1:
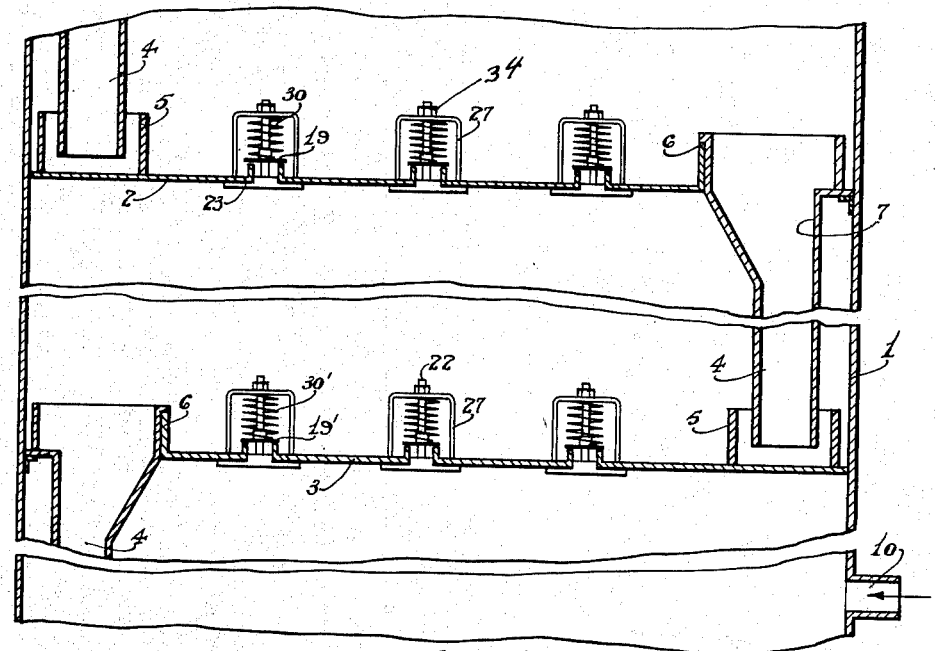
Figure 1 is a sectional elevation of fractional parts of a bubble tower in which the invention has been applied to two trays thereof.

Referring to the drawings, the invention in one form has been shown as applied to a bubble tower 1, only two trays 2 and 3 of which appear in Figure 1. It will be understood, of course, that the bubble tower may have any desired number of trays depending upon the application and use to be made of the bubble tower. In general, bubble towers are provided with five to fifty or more trays, the several towers having diameters selected in accordance with capacity and operational requirements. Each tray of the bubble tower includes a downspout for descending liquid reflux. The liquid reflux descending through down-spout 4 flows over a seal-weir 5 onto and across the tray and over an overflow-weir 6 and thence into a down-spout 7 to the tray 3 which is of identical construction with the tray 2. Each tray is provided with a plurality of openings which, in accordance with the present invention, are normally closed by flow-regulating elements, forty-seven of which appear in the tray of Figure 2. Each flow-regulating element, such for example as the element 19 as best shown in the enlarged sectional view of Figure 4, rests upon an annular upwardly extending flange 17 of bubble tray 2 and forms a seat for the flow element 19 though it may, of course, seat directly on the periphery of an opening in the tray 2. The element 19 has a central opening 20 and has secured to the upper face thereof, as by welding, a fixed upwardly extending guide sleeve 21. A bolt 22 has its lower end connected to a narrow transverse bar or member 23 as at 24, thus forming a T-bolt. The bar 23 is of such a length as to extend beyond the diameter of the opening 16 and is provided with reduced ends 25 that engage the underside of the tray 2 with an intermediate shoulder portion 26 extending into the opening 16 properly to center the bolt 22 relative to the opening when the parts are assembled in the position shown. A substantially U-shaped support 27 (Fig. 4) has an intermediate horizontal portion 28 provided with a central opening with ends of depending arms 29 engaging the top surface of the tray 2 on diametrically opposite sides of opening 16.

Figure 4:
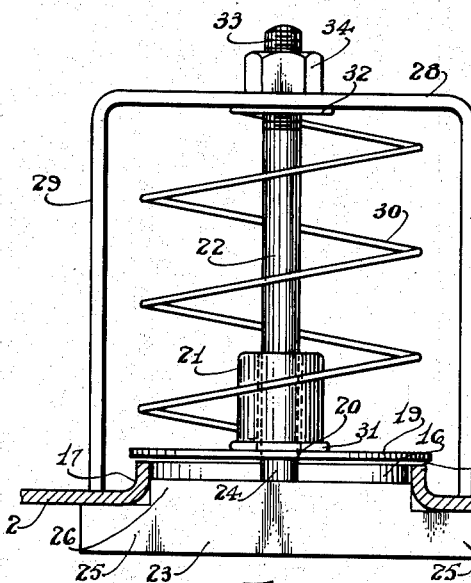
Figure 4 is a sectional side view of a bubble tray and flow regulator constructed in accordance with the present invention.
Figure 15:
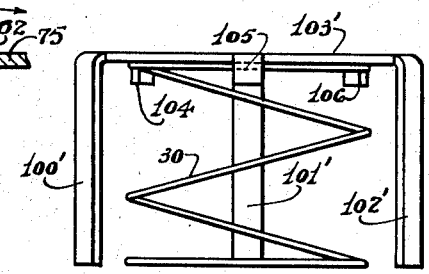
Figure 15 is an elevation of a modified form of a supporting bracket.

In order to control the area of the flow passage produced upon movement of element 19 away from its seat 18, in accordance with the differential of pressure on the respective sides of tray 2, a spring 30 is provided. As shown in Figure 4, the spring is in the form of a coil encircling the bolt 22 and is confined between the flow-controlling element 19 and the horizontal portion 28 of the support 27. The bias of the spring on the element 19 is initially of a low order of magnitude and becomes increasingly effective as element 19 is moved from its seat 18. The lower end of the spring is preferably formed with a reduced loop 31 substantially of the same diameter as the outer diameter of the guide sleeve 21 and at its opposite end may be provided with a similarly formed loop 32 of slightly greater diameter than that of the bolt 22. The reduced loops 31 and 32 maintain the spring in its proper position relative to the flow-controlling element 19 and prevent lateral displacement of the spring with respect thereto. However, the upper end of spring 30 may more desirably be maintained in its proper position at the upper end by guide lugs 104—106 as shown in Figure 15, thus avoiding unevenness of the initial bias of the springs of a plurality of elements 19 as the nuts 34 (Fig. 1) may be tightened to varying degrees on attachment to the tray. In Figure 15, the upper end of spring 30 is held at the maximum diameter of the spring and bears against the horizontal portion 103 of a different shaped support at some distance from the bolt hole in the horizontal portion 103 where nut 34 is applied for attachment of the assembly to the tray.

The upper end of bolt 22 is threaded as at 33 and extends through an opening in portion 28 to receive a retaining nut 34 for maintaining the bolt 22, bar 23 and support 29 in fixed positions when the parts are assembled. The spring 30 is of relatively light weight but is effective to apply a gradually increasing force to the flow-controlling element 19 as it is moved away from its seat 18. The element 19 snugly and evenly fits against seat 18 until a small differential of pressure, sufficient to overcome the weight of element 19, guide sleeve 21 and spring 30 and the small static bias of spring 30, is established across tray 2.

Again referring to Figures 1 and 2, vapors entering the bubble tower 1 through a suitable inlet 10 flow upwardly through the open space within the bubble tower. Though stripping trays may be located in the lower part of the tower, as is customary, they have not been illustrated. The tray 3 may be taken as the lowermost bubble tray in the tower, over which liquid reflux will be flowing as earlier described. When the pressure below the tray 3 exceeds the pressure above the tray 3, vapors will flow through the many openings therein under the control of each of the flow regulators. More particularly, the pressure on the lower surface of element 19' will be opposed by a static resistance comprising the weight of the movable parts, by the initial bias of the spring 30', and by the head of liquid which in the neighborhood of the overflow-weir 6 will be slightly less than the head adjacent the seal-weir 5.

When the pressure below each of the elements 19' on tray 3 exceeds that above it and is slightly above the static resistance, the element 19' will, of course, be lifted from its associated seat to open an annular flow passage for the vapors. The vapors will flow radially outward through the annular flow passage and mix with the liquid reflux near and adjacent the surface of tray 3. The entry of the vapors into the liquid reflux reduces the density thereof in the neighborhood of element 19' and thus reduces the liquid head. However, the spring 30' remains effective to oppose further upward movement of element 19' and to control the extent of displacement of element 19' in accordance with the magnitude of the differential of pressure across it. Thus, there is overcome any tendency of all of the vapors to pass through the single opening controlled by element 19'. The net result is that each of the remaining openings of the tray, each provided with a flow-controlling element, becomes effective, and there is uniformity in division of the flow of vapors throughout all of the openings of the tray 3.

By reason of the uniformity in division of flow through the multiplicity of openings, the velocity of the vapors between the trays is uniform throughout the entire cross-sectional area of the tower and thus not excessive in some areas. Accordingly, there is minimized entrainment and the upward carrying of drops of liquid from one tray to the next by excessive velocity in some areas of rising vapors. By reason of the present invention, there is an abundant formation of foam throughout the entire area of the tray, indicative of the intimacy and effectiveness of contact between the vapor and liquid.

The foregoing operation is in marked contrast with the bubble cap and chimney arrangement of the prior art where the resistance to flow through each opening decreases upon initiation of gas flow therethrough, thus preventing for flow rates somewhat below the designed capacity of the tower uniform subdivision of flow of the rising vapors amongst the bubble caps distributed throughout the surface of each tray.

In contrast, there is in accordance with the present invention uniformity in subdividing the flow of the upwardly rising vapors and the bubble tower as a whole readily adapts itself for any desired capacity or load. For example, when operating at less than 25 percent of its designed capacity, each of the flow-regulating elements 19' will be moved to establish an annular flow passage of small area with the volume of vapors equally subdivided amongst all of the flow passages. On the other hand, for greater loads and for operation above designed capacity, each flow area will automatically be adjusted to a larger value to accommodate the larger amounts of gases and vapors, with equality of subdivision of flow through the multiplicity of openings of each tray. Accordingly, there will not only be uniformity of flow of vapors through the many openings of the tray 3, but there will be simultaneous flow through the multiplicity of openings in the tray 2 just above it and so on with respect to the remaining trays of the bubble tower 1. The bubble tower as a whole is maintained in highly efficient operation for a wide range of loads or capacities under which it may from time to time operate.

Figure 2:
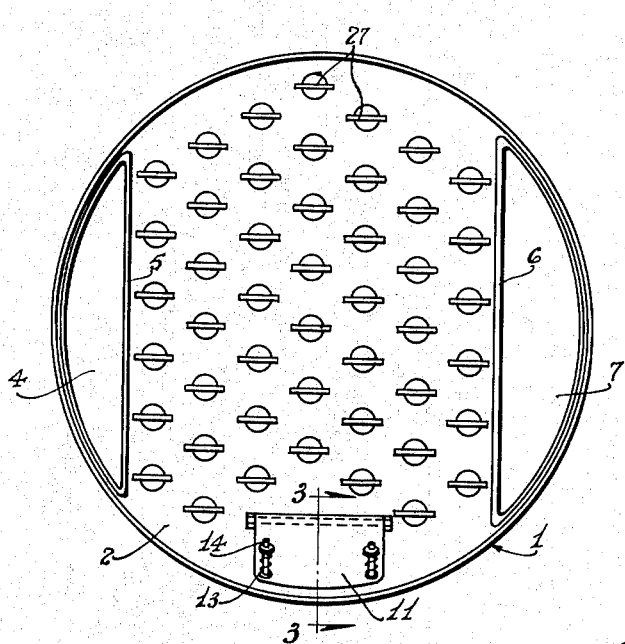
Figure 2 is a plan view of Figure 1.
Figure 3:
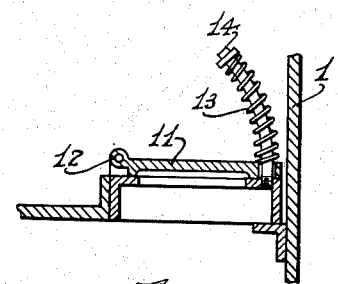
Figure 3 is a sectional view taken on the line 3—3 of Figure 2.

Inasmuch as each of trays 2 and 3, as well as all the rest of the trays of the bubble tower 1, is of relatively large area, it will be understood that upward forces thereon reach substantial magnitude with application of but a few pounds of pressure per square inch. Accordingly, it may sometimes be desirable to provide one or more relief valves, one of which, the valve 11, is shown in Figures 2 and 3, having an area which is relatively large compared to one of the openings provided for vapor flow through the tray. Thus, if there should be a sudden and disproportionate rise of pressure within tower 1 between certain trays resulting from some cause such as the sudden formation of steam from water which had found its way to that area, relief valve 11, pivoted at 12, Figure 3, is moved to open position against the bias of a strong coil spring 13 encircling the curved retaining stem 14. With each tray provided with relief valves 11, such abnormal pressure can quickly be relieved to prevent dislodgment of trays from their supports and to prevent possible damage to the tower itself. The size of the relief valve 11, or if several relief valves are provided the total area covered by them, is selected to insure immediate relief of abnormally high pressures. Such relief valves play no part in the normal operation of the bubble tower and normally form tight seals to prevent flow therethrough of reflux or vapor. The relief valves are designed only to operate upon the occurrence of sudden pressure changes of near explosion proportions within the bubble tower, usually resulting from the sudden formation of steam from water which has found its way into an area where the conditions of temperature and atmosphere, the partial pressure, cause spontaneous and instant evaporation.

As already stated, by subdividing the upwardly flowing vapors and gases into a plurality of streams and then regulating the flow passages in response to the differential in pressure across each flow passage, there is procured uniformity in the division of flow and highly efficient contact between the upwardly flowing vapors and the descending liquid reflux. In operation of one embodiment of the invention, it was determined that a bias due solely to gravity or the weight of the parts does not satisfactorily serve the purpose nor is it the equivalent of a resilient means which applies an opposing forces which increases with displacement of the flow-regulating element from its seat.

Tests of this one embodiment of the invention, where the bias to elements 19 was solely by gravity, resulted in consecutive opening of elements 19 to satisfy the passage area requirement for the volume of gas of a test setting. At the lowest rates of gas passage, one element would start opening and continue to open wider as the rate of gas increased until the element was wide open. At this point another would start opening and continue as the gas rate increased until finally it was also wide open. Finally, upon reaching a gas rate of the maximum used in commercial practice about four elements 19 were handling all of the gas, with the remainder of some forty-five elements remaining closed. Apparently some very small variance in the initial resistance to movement of these elements caused them to start opening in the order of the lesser magnitude of such resistance. Whenever one started opening and the gas started mixing with the liquid, the liquid density decreased and the valve moved to wide open position. At this point another valve would start opening. Even though there was not a decrease in liquid density the same performance no doubt would have resulted, because an element 19 has the same weight whether in a near closed or in a wide open position. Thus, considerable volume variance would be possible through the range of one element opening before the next plateau of pressure differential across the tray ensued to fall in the pressure differential range of such next element. When the weight alone is used as a biasing force the flow-controlling element 19 becomes selective of pressure differential throughout its capacity range, thus it passes all the gas available in its capacity range before a new pressure differential, suitable for another element 19 to function, is permitted. However, by utilizing the spring the action was immediately stabilized and the new results already described achieved.

The foregoing explanation of the operation of the invention is based upon comparative operation of a bubble tower five feet in diameter and generally used as an absorber in petroleum refining operations. With standard bubble caps and chimneys, it was observed that with a liquid reflux flow rate varying from about 67 gallons per minute to around 313 gallons per minute with the gas flow varying from around 300 standard cubic feet per minute to around 729 standard cubic feet per minute there was not uniform bubbling through the 49 bubble caps arranged in six rows of 7 to 9 caps per row. In no case could any more than about three-quarters of the bubble caps be made to take gas by adjustment of both the liquid and gas throughout the full range of volumes. On the average, and even perhaps for the greater part of the tests made, only two rows were in effective operation, or all gas was flowing through only approximately one-third of the total number of openings through the tray.

In contrast, with the present invention applied to tray openings in the same tray with springs 2½ inches in diameter made of 16 gauge wire, exerting a static bias of 4 ounces in addition to a weight of 2.6 ounces for the element 19 and its guide sleeve, on each flow-controlling element, with the bias of the spring increasing ¾ ounce for each $\frac{1}{16}$ inch of movement, all the openings on the tray were in effective operation not only through the aforesaid range of flow of liquid and aforesaid range of flow of gas and vapor, but also they remained effective for gas rates as low as 300 standard cubic feet per minute and flow of liquid of the maximum attainable on the test equipment, or 337 gallons per minute, and also with gas flow upwardly of 1426 standard cubic feet per minute against all liquid rates of flow.

Figure 6:
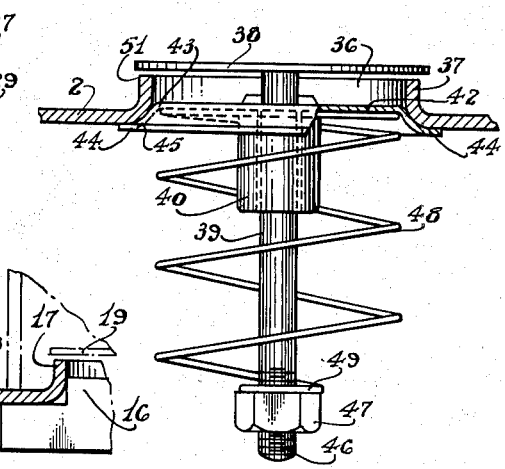
Figure 6 is a sectional view of a modified form of the invention showing the spring means positioned below the flow regulator and tray.
Figure 5:
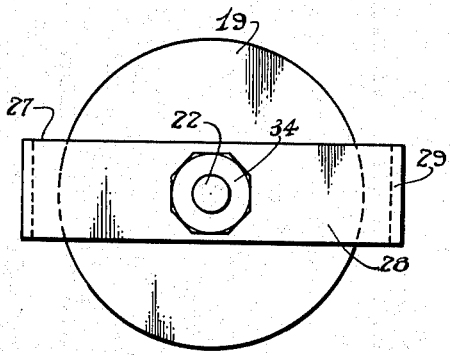
Figure 5 is a detail plan view of Figure 4.
Figure 7:
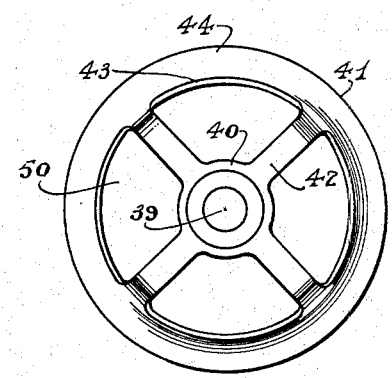
Figure 7 is a detail plan view of a disc and spring stop shown in Figure 6.

With the foregoing understanding of the invention, it will now be apparent that many modifications may be made within the spirit and scope of the appended claim. For example as shown in Figures 6 and 7, each of the openings of the several trays in the tower, such for example as the tray 2, may be provided with a flow-controlling element 38 resting upon a seat 51. Depending from element 38 is a guide stem 39 which is axially slidable in a guide sleeve 40 which is welded or otherwise secured to arms or webs 42 extending from an annular flared portion 44 of larger diameter than the opening 36 of the tray 2. The rim 41 of the flared portion 44 engages the underside of the tray 2 as at 45 snugly and evenly to bear against the lower portion of the tray 2 and thus center the stem 39 in the opening 36 to maintain it normal to the plane of that opening so that the flow-controlling element 38 will seat firmly throughout the annular valve seat 51 formed on annular upwardly extending flange 37.

Figure 8:
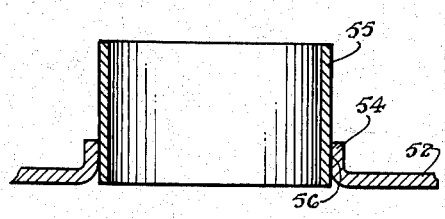
Figure 8 is a sectional view of a tray having an opening therein provided with a stub chimney.

The lower or free end portion 46 of the stem 39 is threaded so as to adjustably receive a retaining and adjusting nut 47. Confined between the arms or webs 42 and the nut 47 is a coil spring 48 which encloses the stem 39 and is provided at one end with a reduced loop 49 for centering the spring on the stem 39. In this modification of the invention, the spring 48 serves to hold the rim 41 in fixed position against the underside of the tray 2 and also serves to apply a spring bias to the stem 39 in a direction to hold the flow-controlling element 38 against the seat 51 until there is present sufficient differential of pressure to move it from the seat 51 to open the flow passage between element 38 and seat 51.

Where higher liquid levels are to be maintained above the tray, such for example as the tray 52 of Figure 8, a tubular chimney 55 may be connected to the flange 54 by any suitable means such as rolling, welding, brazing, or the like, as at 56, to form a seat higher above the tray 52 than the seat illustrated in Figures 4 and 6.

Figure 9:
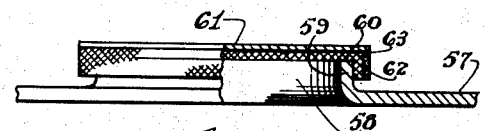
Figure 9 is a detail side view with parts in section of the bubble tray provided with dispersing means around the periphery of the opening for breaking up the gas into small bubbles when brought into contact with the surrounding liquid.

Figure 9 shows a bubble tray 57 having an opening 58 and an annular flared or flange portion 59 provided with a seat 60 for receiving a disc-shaped element 61 which may be similar in construction and operation to either the valve 19 or 38 previously described. A cylinder of mesh wire 62 has its upper end connected as at 63 to the edge, or as shown, to the underside of the disc-element 61 adjacent the outer periphery thereof so as to enclose and be outwardly spaced from the annular flange 59, and thus provide means for further dispersing the gas passing upwardly through the opening 58 into contact with the liquid above the tray 57 when the element 61 is raised away from its seat.

Figure 10:
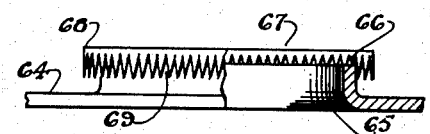
Figure 10 is a side view similar to Figure 9 of a further modification.

As shown in Figure 10, the flow-controlling element 67 may be provided with an outer downwardly extending flange 68 in spaced relation with the flared seat 66 of a tray 64. The depending flange or wall 68 of the cup-shaped flow-controlling element 67 has a plurality of tapered or saw-tooth notches 69 to provide for subdivision of the vapor and gas flowing through each opening 65.

Figure 12:
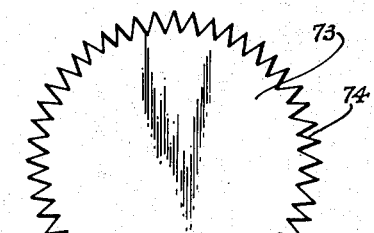
Figure 12 is a plan view of the flow regulator shown in Figure 11.
Figure 11:
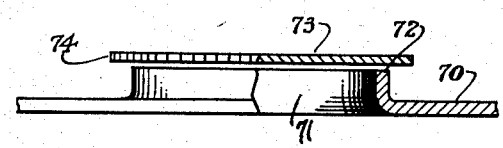
Figure 11 is a side view similar to Figure 9 of another modification.

In Figures 11 and 12, the controlling element 73 has a central portion which closes the opening 71 of a tray 70 and is provided with a saw-tooth periphery formed by the serrations or teeth 74 (Fig. 12) which extend outwardly from the annular flange 72 of the tray. Such teeth are useful for providing additional means for dispersion of the gas or vapor passing upwardly through the openings 71 into contact with the liquid on the tray 70.

Figure 13:
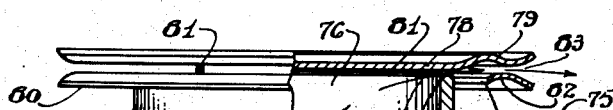
Figure 13 is a side view with parts in section of another modification.

For increased mixture of the upwardly rising vapor and gas with the liquid on each tray, the annular Venturi arrangement of Figure 13 may be utilized. As shown, each tray 75 of the tower has each opening therethrough provided with a flow-controlling element 78 in the form of a disc, the outer peripheral portion preferably curved or shaped as at 79 to form the upper half of a laterally extending Venturi passage. A ring 80 of substantially the same outside diameter as the element 78 is secured by any suitable means, as by spot welding at 81, to the element 78. The ring 80 is shaped as at 82 to coact with the portion 79 of element 78 as the lower half of the laterally extending Venturi opening 83. It will be seen that gas passing through the opening 76 into the throat of the venturi 83 as indicated by the arrow 84 forms a slight low pressure area at the throat of the venturi. Liquid on the tray 75 is thus drawn into the low pressure area through the opening 85 so as to mix with the gas issuing from the opening 76 to insure intimate contact of the gas and the liquid. Thus, there is both intimate mixing of vapor and gas with the liquid within the venturi and there is likewise added mixing by the jet action of the annular discharge from the Venturi opening 83. It is to be further observed that the movement of the flow-controlling element 78 regulates the extent of action of the venturi by reason of the variation in the opening formed between element 78 and seat 77 resulting in variable volumes of gas or vapor impinging into the throat of venturi 83. Thus, the venturi will be quite effective until the space between element 78 and seat 77 closely approaches or exceeds the spacing of element 78 and ring 80 at Venturi opening 83. This is in the right direction, however, since for the greater gas flow there is less need for the recirculation of the oil through the venturi, the velocity of the annular stream of gas parallel to the tray 75 then being adequate for the intimate mixing and production of foam which is indicative of efficient action about the opening 76.

In the modifications of Figures 9–13, it is, of course, to be understood that one or the other of the spring mounting means of Figures 1–7, such as the support 27, spring 30 and their associated parts (Fig. 4), in conjunction with, or without, a stub chimney of Figure 8, may be utilized or other equivalent arrangements adopted for each of the variable movements of flow control elements with respect to their associated seats. It is to be further understood that while reference has been made to bubble towers, that term has been used both in the specification and in the claim to refer to vapor and liquid contact devices such as towers for absorption, distillation, fractionation, rectification, dehydration, saturatiton, cooling, heating and dephlegmation, and other related operations where gas is brought into intimate contact with a liquid.

Figure 14:
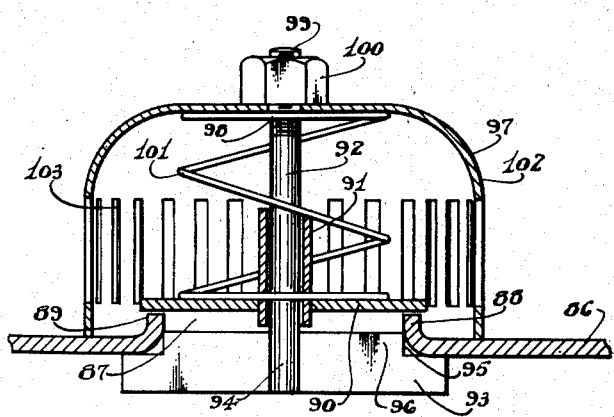
Figure 14 is a sectional view of an application of the invention to a bubble tray opening which includes a bubble cap of conventional construction.

Bubble caps may be used in accordance with the present invention in the manner shown in Figure 14 in which the invention has been shown applied to a bubble cap, such as disclosed in my Patent 2,428,889, October 14, 1947. This arrangement of Figure 14 may also be readily utilized in existing bubble towers to substitute for chimneys. The bubble tray 86 is provided with one or more openings 87 provided with an annular flange wall 88 extending upwardly therefrom and forming a seat 89 normally closed by a flow-regulating element 90 having a centrally disposed tubular guide sleeve 91 through which axially extends a T-bolt 92. To the lower end of the bolt 92 is connected a transverse bar 93 as at 94 and the ends of this bar are offset as at 95 so as to engage the underside of the tray 86 and form a reduced upwardly extending intermediate portion 96 that projects into the opening 87 so as to properly center the bolt 92 in a fixed position when the parts are assembled. The bubble cap 97 has a central opening 98 through which extends the upper threaded portion 99 of the bolt 92. The bubble cap and T-bolt 92 are maintained in a fixed position relative to the tray by tightening up the nut 100 on the bolt 92. Surrounding the T-bolt 92 and confined between the element 90 and the inner wall of the bubble cap 97 is a coil spring 101 for normally urging the element 90 downwardly against its seat 89 so as to close the opening 87. The side or skirt 102 of the bubble cap 97 is formed with circumferentially spaced elongated slots 103 to allow the vapors and gas below the tray 86 to be brought into intimate contact with the liquid passing over or above the tray and the cap 97, when the pressure of the gas is sufficient to raise the valve 90 away from its seat 89.

In order to assure disposition of tops of bolt 22 and spring 30 in the proper position to afford the proper functioning of flow-controlling element 19 (Fig. 4), a spring support such as shown in Figure 15 may be utilized. By providing the three downwardly extending legs 100', 101', 102', the horizontal section or cross member 103' will be automatically positioned parallel to the plane of the upper surface of the bubble tray 2 and hence parallel to the upper plane of the seat 18. The horizontal portion is preferably of triangular shape and is provided with downturned spring lugs 104, 105, 106 disposed respectively intermediate the downturned legs 100, 101, 102 which are disposed at 120° apart. The three-legged support is geometrically stable and the lugs in the upper portion thereof permit the use of an open type of spring; that is, one in which the shape or diameter of the uppermost coil of the spring is the same as that of the body of the spring, eliminating the inturned portion or loop 32 illustrated on the spring of Figure 4.

Figure 16:
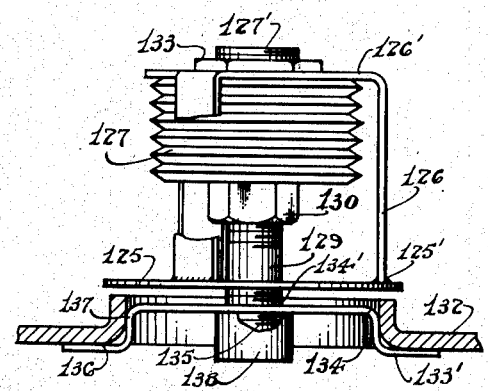
Figure 16 is a sectional view of a further modification.
Figure 17:
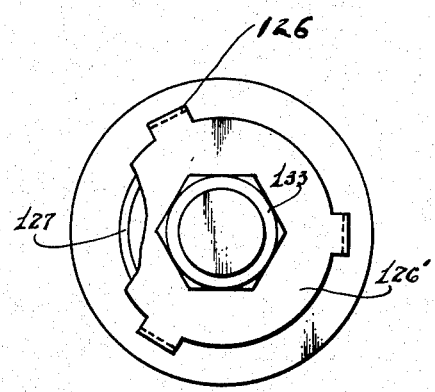
Figure 17 is a plan view of Figure 16.

In the modification shown in Figures 16 and 17, the flow-controlling element 125 is secured as at 125' to the legs 126 of a yoke which, as shown, is provided with three legs and a curved upper body portion 126' that constitutes the top of the yoke. A metallic bellows 127 is provided with an externally threaded hub or boss 127' which extends through an opening in the transverse portion 126' of the yoke and is firmly maintained in position thereon by the clamping nut 133. The bellows 127 communicates at its lower end with a flow pipe 129 through a tubular hub or nut 130 on the lower end thereof. The pipe 129 preferably is threaded into the hub 130 so as to be adjustable and releasably attached thereto. The lower end of the pipe 129 is preferably externally threaded as at 135 and extends through a central opening 134' of the flexible attaching member 134. A threaded clamping member or boss 138 is connected to the lower end of the pipe 129 so as to engage the underside of the member 134 in order to maintain the latter in a fixed position. Additionally, the member 134 has its outer peripheral edge 133' shaped or offset to engage the underside of the plate 132 as at 136 and also bears against the wall of the tray opening as at 137 when the parts are assembled. In this form of the invention, the bias of the bellows 127, acting as a spring, holds element 125 in contact with its seat on the tray opening before a pressure differential is established across the tray. When pressure differential starts to develop across the tray pressure travels into bellows 127 from below the tray through pipe 129 which is open to below the tray 132. Also pressure underneath element 125 urges it away from its seat, transmitting such force through yoke 126 to stretch bellows 127. Since both of these effects of pressure differential act in the same direction, or to stretch the bellows, it can be stated that travel of element 125 by pressure from below is partially amplified by the expansion of the bellows from relative pressure increase from within. With this arrangement, and the proper selection of the tension and expansion specifications of bellows 127, element 125 may be made to operate for the minimum desired pressure differential across tray floor 132 through a wide range of flow rates or required volumes of gas or vapors to be passed through tray opening as may be desirable in a bubble tower to function under extremely low pressure, such as a vacuum still.

Figure 18:
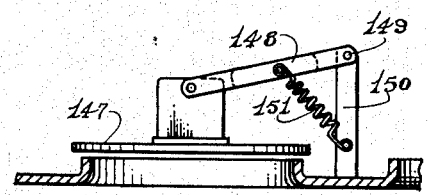
Figure 18 is a sectional elevation of a further modification of the invention.

In Figure 18, the flow-controlling element 147 is guided by a hinged element 148 pivoted at 149 on post 150. A tension spring 151 develops the gradually increasing force in response to increase of the differential of pressure against element 147.

Figure 19:
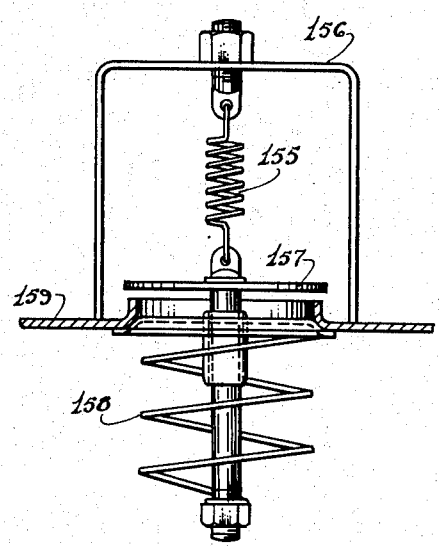
Figure 19 is a sectional view of another modification.

In certain of the preceding modifications of the invention, a counterweight may be applied to overcome the weight of the parts which tend to hold each flow-controlling element against its seat. Instead of a counterweight, an anti-gravity spring 155, as in Figure 19, may extend from the cross member 156 of the supporting bracket to the flow-controlling element 157, a spring 158 and associated mounting being provided as in the case of the modification of Figure 6. The anti-gravity spring 155 has a characteristic such that the bias exerted on element 157 changes but a very small amount with change in position of element 157. Hence, it is for all practical purposes the spring equivalent of a counterweight. Such a provision tends to minimize the differential of pressure required across the bubble tray 159 through movement of element 157 is opposed by the spring force of spring 158.

It will be understood that the method and various embodiments of the invention shown are merely illustrative and that such changes may be made as come within the scope of the following claim without departure from the spirit of the invention.

What is claimed is:

In a gas and liquid contact apparatus of the class described, a horizontally disposed tray plate upon which liquid can accumulate to a desired level, said tray plate having a plurality of openings, each of said openings constituting a flow passage and having a flow controlling seat, an element engageable with said seat for closing the openings, spring means operatively connected to said element for normally maintaining the same in engagement with said seat, means for introducing liquid into the apparatus above said tray plate, and means for introducing gas into the apparatus below the tray plate, the tension of the spring means being such that the displacement of said element from its seat and thereby the resistance to gas flow is proportional to the pressure differential across the tray to simultaneously raise the elements away from their seats so that the passages provide a plurality of uniformly distributing gas streams which are brought into intimate contact with the liquid carried by the tray at relatively high velocity so as to break up the gas into fine bubbles during the operation of the apparatus.

IRVIN E. NUTTER.

References Cited in the file of this patent

UNITED STATES PATENTS

| Number | Name | Date |
|---|---|---|
| 1,880,525 | Taylor | Oct. 4, 1932 |
| 2,045,518 | Chatfield | June 23, 1936 |
| 2,061,830 | Campbell | Nov. 24, 1936 |
| 2,105,501 | Parsons | Jan. 18, 1938 |
| 2,205,284 | Eckart | June 18, 1940 |
| 2,218,993 | Rupp et al. | Oct. 22, 1940 |
| 2,428,889 | Nutter | Oct. 14, 1947 |
| 2,525,064 | Bragg | Oct. 10, 1950 |

FOREIGN PATENTS

| Number | Country | Date |
|---|---|---|
| 619,029 | France | Dec. 23, 1926 |